United States Patent [19]

Bieganski

[11] Patent Number: 5,009,005
[45] Date of Patent: Apr. 23, 1991

[54] CABLE STRIPPER

[76] Inventor: Zdzislaw Bieganski, "Brushwood", Kinsbourne Green, Harpenden Hertfordshire, United Kingdom

[21] Appl. No.: 451,114

[22] Filed: Dec. 14, 1989

[51] Int. Cl.[5] .................. B26B 27/00; B21F 13/00; B23D 21/06; H02G 1/12
[52] U.S. Cl. .................................. 30/90.6; 30/90.1; 30/91.1; 81/9.44
[58] Field of Search ............... 30/90.6, 91.1, 90.1, 30/90.2, 90.4, 90.5; 81/9.4, 9.44, 9.5, 9.2

[56] References Cited

U.S. PATENT DOCUMENTS

| | | | |
|---|---|---|---|
| 2,089,528 | 8/1937 | Barycz | 81/9.4 |
| 3,169,315 | 2/1965 | Manrovitz | 30/91.1 |
| 3,215,007 | 11/1965 | Stallings | 30/91.1 |
| 3,914,864 | 10/1975 | Prince | 30/91.1 |
| 4,070,930 | 1/1978 | Oprins | 30/91.1 |
| 4,277,887 | 7/1981 | Rady | 30/91.1 |
| 4,625,386 | 12/1986 | Bieganski | 30/90.1 |
| 4,640,009 | 2/1987 | Liversidge | 81/9.44 |

Primary Examiner—Douglas D. Watts
Assistant Examiner—Paul M. Heyrana, Sr.
Attorney, Agent, or Firm—Learman & McCulloch

[57] ABSTRACT

A cable stripping tool has a pair of jaws which can be closed together, one of which is formed with cruciform slots 14, 16, so that a cable can be supported in one or other of the slots. The other jaw carries a cutting tool aligned with the center of the slots, so that when the cable is so inserted and the jaws are closed, the tool will cut into the cable and then by pulling the cable along the length of its supporting slot 14, an axially extending cut can be produced into the cable sheath; or by rotating the complete tool about the cable when it is supported in the slot 16, an encircling cut can be produced. The position of the cutter relative to the center point of the cruciform slots can be adjusted angularly so as to keep the blade in the best position irrespective of the diameter of the cable involved.

8 Claims, 2 Drawing Sheets

CABLE STRIPPER

This invention relates to cable strippers.

U.S. Pat. No. 3,169,315 shows a somewhat pliers-like tool for stripping cables in which one jaw has grooves extending in cruciform fashion and the other jaw carries a cutter. When the cable is placed in one of the grooves extending parallel to the pivot of the jaws, and the jaws are closed together, the cutter can penetrate the cable sheath and when the tool is rotated about the cable this makes a peripheral cut. When the cable is placed in the other groove, extending along the length of the jaws, and the jaws are closed together, the cutter again penetrates the cable sheath and can make an axial slit in the cable when there is relative movement between the tool and cable; and hence the sheath can be separated from the core and peeled off.

In one of the embodiments described in the said U.S. Patent, the cutter blade is adjustable in projection so as to be able to make cuts of different depth in the cable (FIGS. 1-3, and FIGS. 4 and 4a) and in another embodiment in the said patent a plurality of cutters project to different radial amounts on a part which can be indexed, by rotation about an axis parallel to the pivot axis of the jaws so that any one of those cutters can be in the operative position, and because they are all of different radial projections they can be used to make cuts of different depth.

However, whilst the tool of said U.S. patent can cope with insulations of different thickness by the mentioned arrangements if can only cope with cables of different diameter within a relatively narrow range. The present inventor has discovered the reasons for this limitation and the present invention aims to provide a tool of the same general kind but capable of use with a wider range of cable diameters.

According to the invention, a cable stripping tool of the kind comprising a pair of pivoted jaws with cruciform grooves on one jaw and a cutter on the other, is characterised in that the cutter is movable relative to the axis of pivoting of the jaws so as to enable the cutter to be adjusted in position so as to be opposite to the groove system irrespective of the extent of opening of the jaws.

According to one possibility, the cutter is mounted on a component connected to the one jaw by means of an adjustment system allowing the cutter to be moved bodily along the length of the jaw. Conveniently the jaw has an elongated slot and the cutter is mounted by means of a pin and nut passed through that slot.

According to another possibility, the cutter is arranged to be indexed through relatively small angular increments about an axis parallel to the pivot axis. By these means, the cutter can be appropriately positioned as mentioned. This indexing is independent of, and may be additional to indexing necessary to bring different radially directed blades into the required position for use.

One embodiment of the present invention is now more particularly described by way of example and with reference to the accompanying drawings wherein FIG. 1 is a plan view of a cable stripping tool according to the invention;

Figure 1:
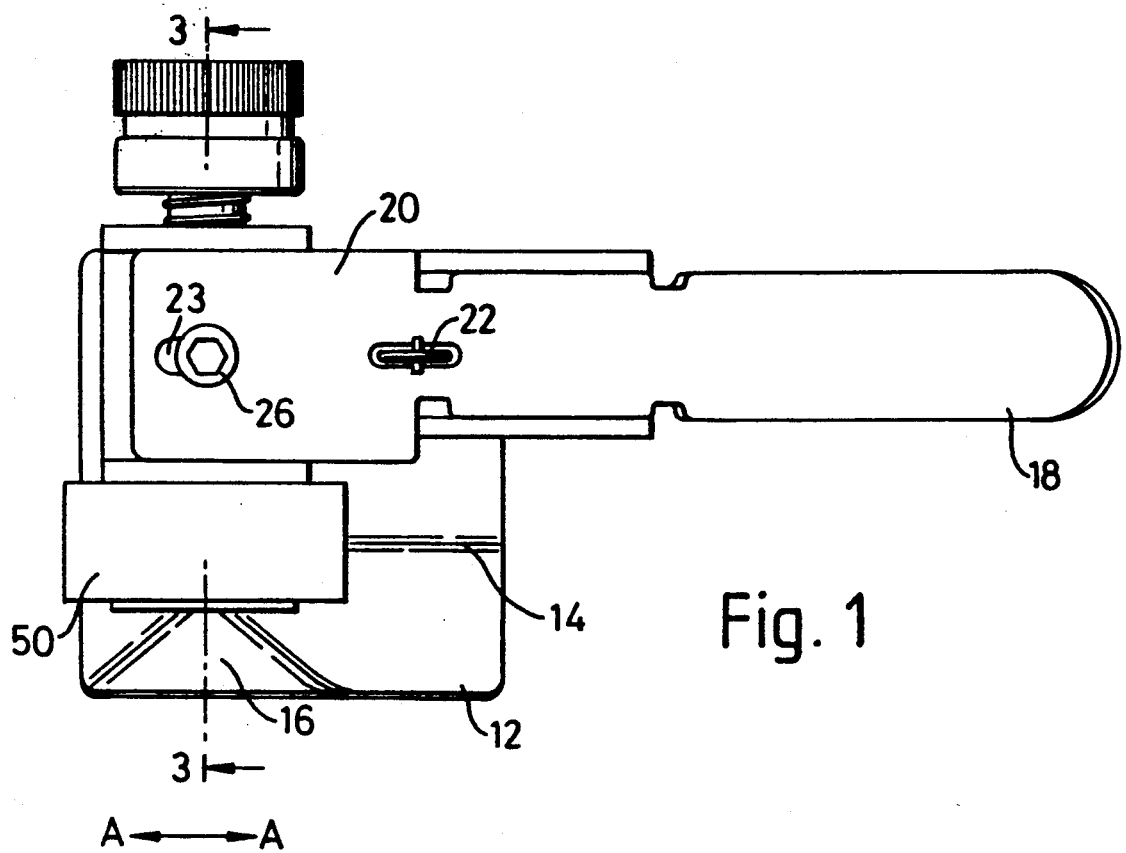
Figure 2:
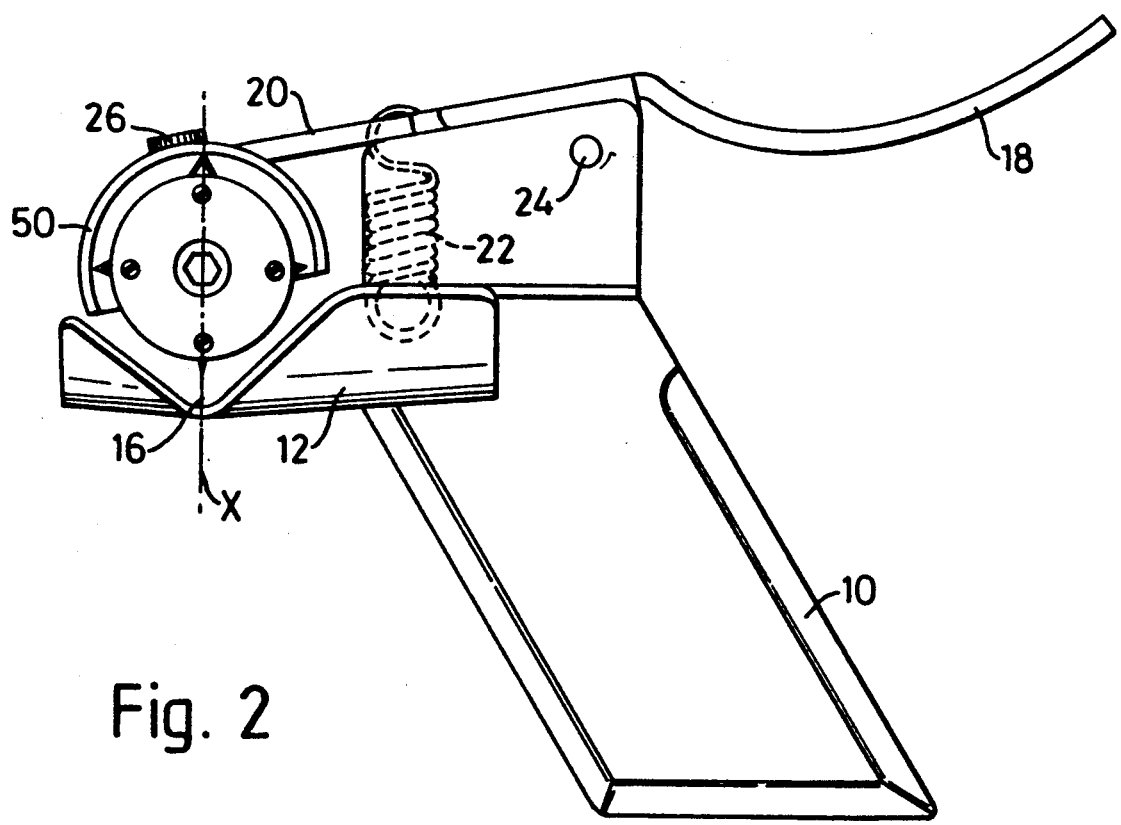
FIG. 2 is a side elevation of the same.

Referring to the drawings, the tool comprises a handle conveniently in the form of a pistol grip 10 carrying a fixed jaw 12 conveniently made as a metal pressing and having cruciform "v" grooves 14 and 16 therein.

Pivoted on the handle is a lever like member 18 made integral with a second jaw 20, and a tension spring 22 pivots the jaws about the pivot axis of the pin 24 to close them together. The groove 14 is normal to the axis of the pin 24 whereas the groove 16 is parallel to such axis.

The jaw 20 has an elongate slot 23 and a cutter head or support generally indicated by the reference numeral 25 is fixed to the jaw by means of an adjustment bolt 26 passed through that slot and engaged in the head. This enables the whole head to be moved toward and away from the pivot pin axis in the directions of the arrows A—A, FIG. 1 as more particularly explained hereinafter.

Figure 3:
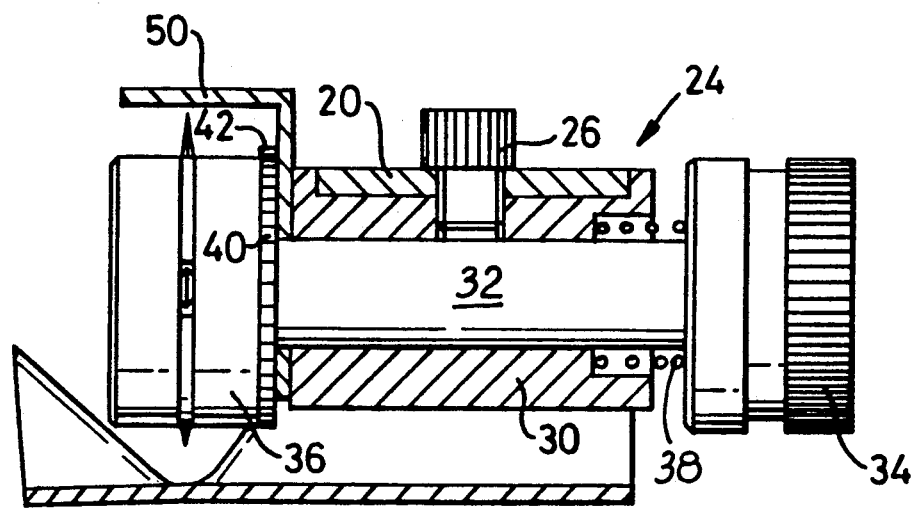
FIG. 3 is a section on the line 3—3 of FIG. 1 on an enlarged scale.

The cutter support comprises a rotor or body 30 which is fixed in position by the said screw 26 and a spindle 32 which is axially displaceable in the body 30 and also angularly adjustable therein. The spindle has an operating knob 34 at one end and a cutter clamp assembly 36 at the other end. Helical spring 38 urges the spindle in the direction of the arrow B, FIG. 3.

The cutter clamp assembly comprises an index member which may conveniently be shaped like a chain sprocket 40 which engages with a fixed detent pin 42 so as to locate the spindle 32 in a selected angular position. The knob 34 is used to displace the spindle axially so as to disengage the pin from the peripheral teeth on the index member 40, allowing it to be turned (by use of the knob 34) to a fresh position, when the spring will return the stem and re-engage the index pin thus locking the part 32 in the newly selected position.

Clamp assembly 36 comprises a pair of disks with cutters also therebetween, the whole being fixed together by an axially located screw 44.

The cutter preferably has a plurality, for example four radially projecting pointed edges or blades of different projection so as to make cuts of different depth. Alternatively the blades may be separate pieces received in radial pockets between the two parts of the clamp assembly so that by loosening the screw 44, any of the blades can be radially displaced so as to cut to a greater or lesser extent, as may be required.

A fixed shield 50 is provided mounted on the body 30 so as to protect the user against the cutter blades.

Figure 4:
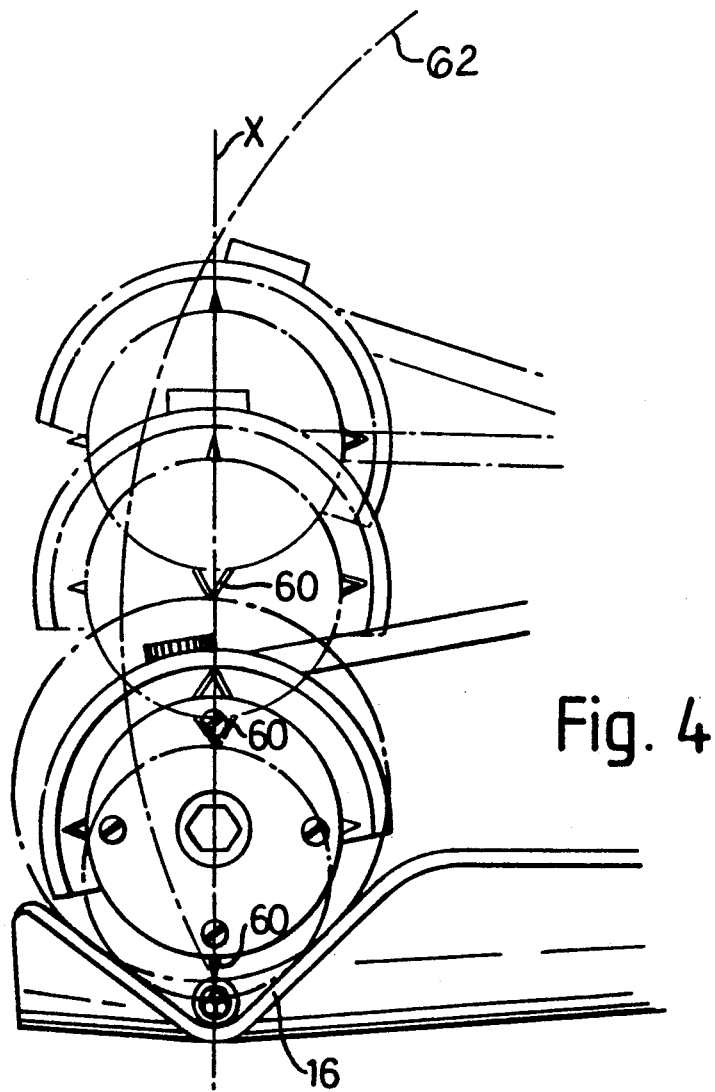
FIG. 4 is a fragmentary elevation in the same direction as FIG. 2 but showing the parts in different positions according to cable size.

It will be appreciated that for best use, the selected cutter blade should conofront the groove 16 and lie in the single plane X which is coincident with the axis of the groove 16 and parallel to the plane Y passing through the axis of the pivot 24 in any selected position of pivotal adjustment of the jaws. (The blade will always lie in a plane intersecting the axis of the groove 14, irrespective of the extent of angular separation of the jaws). A cutter blade such as 60, FIG. 4, will move along the chain dot line 62 as the jaws separate thereby departing from axis X. The cutter blade can be restored to the required position according to the extent of opening movement needed for a particular cable diameter by use of either the slot 23 and screw adjustment bolt 26 or by an indexing operation or both, so as to occupy the position shown in ghost lines in the Figure.

Having now described by invention what I claim is:

1. A cable stripping tool comprising a pair of jaws; means coupling said jaws for rocking movements about a pivot axis, one of said jaws having therein a cable-receiving groove having a longitudinal axis parallel to said pivot axis; a cutter having a cutting point; and means mounting said cutter on the other of said jaws for adjustment to a position in which said cutting point lies in a single plane coincident with said longitudinal axis and parallel to said pivot axis in any selected pivotally adjusted position of said jaws.

2. A tool according to claim 1 wherein said mounting means comprises a support for said cutter, said support being adjustable in directions toward and away from said pivot axis.

3. A tool according to claim 2 wherein said other of said jaws has an elongated slot and said support carries a bolt slideably passing through said slot.

4. A tool according to claim 1 wherein said mounting means comprises a rotor rotatable about an axis parallel to said pivot axis and detent means for releasably maintaining said rotor in a selected position of adjustment.

5. A tool according to claim 1 wherein said mounting means comprises a support for said cutter, said support being adjustable in directions toward and away from said pivot axis, said support also being rotatable about an axis parallel to said pivot axis.

6. A cable stripping tool comprising a pair of jaws; means mounting said jaws for relative pivotal movement about an axis, one of said jaws having a cable-accommodating groove therein having a longitudinal axis parallel to but spaced from said pivot axis; cutting means having a cable engageable edge; means mounting said cutting means on the other of said jaws for movement toward and away from said one of said jaws in response to pivotal movement of said jaws and along an arc having its center at said pivot axis, such pivotal movement of said jaws causing said edge of said cutting means to move to one side or other of a single plane coincident with the axis of said groove and parallel to said pivot axis; and means for adjusting said cutting means relative to said other of said jaws to a position in which said edge of said cutting means lies in said single plane in any selected position of pivotal adjustment of said jaws.

7. A tool according to claim 6 wherein said mounting means is adjustable by said adjusting means in directions toward and away from said pivot axis.

8. A tool according to claim 6 wherein said mounting means is rotatable about an axis parallel to said pivot axis.

* * * * *